United States Patent Office 3,839,374
Patented Oct. 1, 1974

3,839,374
PREPARATION OF ESTERS
Richard F. Love, Fishkill, N.Y., assignor to
Texaco Inc., New York, N.Y.
No Drawing. Filed Dec. 8, 1971, Ser. No. 206,200
Int. Cl. C07d 67/00
U.S. Cl. 260—410.9 R          23 Claims

ABSTRACT OF THE DISCLOSURE

A method for preparing esters, and as a valuable by-product nitroalkanes, by catalytically cleaving and reacting an alpha-nitroketone with an alcohol in a non-aqueous environment at a temperature of from about 20° C. to about 120° C. The esters so prepared are useful as synthetic lubricants, cutting oils, plasticizers, cosmetic additives and surfactant additives.

BACKGROUND OF THE INVENTION

This invention relates to a novel method of preparing esters from alpha-nitroketones. In particular, it relates to a method for preparing esters by catalytically cleaving and esterifying alpha-nitroketones to produce an ester and as a coproduct a nitroalkane.

In the past, cleavage and esterification of alpha-nitroketones with alcohols was undertaken catalytically employing as catalyst such materials as alkali and alkaline earth oxides, hydroxides and alkoxides or organic amines. One serious disadvantage in such a process resided in the threat of explosion between such highly basic catalytic materials and the products of the reaction, notably the nitroparaffin. Further, if high concentrations of such oxide or hydroxide catalysts are used, a mixture of carboxylic acids and their salts is obtained. The use of ammonia or primary and secondary amines moreover results in the formation of amides together with the ester. Each of the aforementioned disadvantages detract from the commercial attractiveness of the process.

It is therefore an object of this invention to provide a method for the preparation of esters from alpha-nitroketones.

It is another object of this invention to provide a method for the preparation of esters from alpha-nitroketones wherein the products can be safely recovered in high yields.

Yet another object of this invention is to provide a method for preparing esters employing catalysts which minimize undesirable by-product formation.

Other objects and advantages will become apparent from a reading of the following detailed description and examples.

SUMMARY OF THE INVENTION

Broadly, this invention contemplates a method for the preparation of esters which comprises catalytically cleaving and reacting an alpha-nitroketone with an alcohol at a temperature of from about 20° C. to about 120° C. in a non-aqueous environment with a catalyst selected from the group consisting of carbonates, fluorides and salts of weakly acidic ion exchange resins of the metals sodium, potassium and calcium.

According to our invention the alpha-nitroketones catalytically cleaved and esterified in the instant invention correspond to the formula:

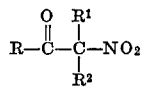

where R is an alkyl group having from 1 to 20 carbon atoms or an aryl group of from 6 to 20 carbon atoms and where $R^1$ and $R^2$ are hydrogen, alkyl groups of from 1 to 20 carbon atoms or aryl groups of from 6 to 20 carbon atoms. Combinations of groups may be present as for example R can be alkyl and $R^1$ and $R^2$ hydrogen or R and $R^1$ may be aryl and $R^2$ hydrogen, or R may be alkyl, $R^1$ hydrogen and $R^2$ aryl. Illustrative of the alpha-nitroketones contemplated herein can be mentioned 1-nitro-2-butanone, 3-nitro-2-butanone, 2-methyl-2-nitrobutanone, 2-nitro-3-pentanone, 1-nitro-2-pentanone, 3-nitro-2-pentanone, 1-nitro-2-hexanone, 3-nitro-2-hexanone, 4-nitro-3-hexanone, 1-nitro-2-heptanone, 3-nitro-4-heptanone, 5-nitro-4-octanone, 4-nitro-5-decanone, 5-nitro-4-dodecanone, 1-nitro-1-phenyl-propanone, 2-nitro-1-phenylpropanone, alpha-nitrobenzylphenyl-ketone, 1,4-diphenyl-3-nitro-2-butanone, 3-nitro-4-pentadecanone, 1-nitro-2-hexadecanone, 9-nitro-8-heptadecanone, 8-nitro-9-heptadecanone, 1-nitro-2-octadecanone, 1-nitro-2-nonadecanone, 5-nitro-6-eicosanone and 1-nitro-2-heneicosanone.

Alcohols contemplated herein correspond to the formula $R^3OH$ and are limited to primary and secondary alcohols. Tertiary alcohols have not been found to be reactive in the instant catalytic method. Thus in the formula above $R^3$ can be an alkyl group of from 1 to 20 carbon atoms such as methyl, ethyl, propyl, butyl, hexyl, octyl, decyl, dodecyl or hexadecyl. Dihydroxy and polyhydroxy primary and secondary alcohols are also intended to be understood as operative in the instant process. Illustrative of the alcohols contemplated herein I mention methanol, ethanol, propanol, isopropanol, n-butanol, 2-hexanol, cyclohexanol, 2-octanol, 2-decanol, 1-dodecanol, 1-hexadecanol, ethylene glycol, propylene glycol and pentaerythritol. Mixtures of alcohols such as $C_{10}$ to $C_{13}$ alcohols are contemplated including isomeric mixtures containing primary and secondary alcohols. At least 1 mole and up to 100 moles of alcohol per mole of alpha-nitroketone are employed and preferably from 5 to 25 moles of alcohol per mole of alpha-nitroketone are present during the course of the reaction. Most importantly the reaction must be conducted in a non-aqueous environment, that is, in the substantial absence of water. The catalyst cleavage and reaction is sensitive to water and water in amounts exceeding 0.1 weight precent based on the weight of alcohol employed cause competing reactions to occur leading to the formation of acids instead of the desired esters. Excessive amounts of alcohol can be employed serving as solvent for the reaction or alternatively an inert reaction solvent may be employed such as n-hexane, n-heptane, xylene, ethylbenzene, dichlorobenzene, methylnaphthalene, dioxane and tertiary alcohols.

The simultaneous cleavage and esterification is conducted catalytically, that is, in the presence of a catalytic agent at a temperature of from about 20 to about 120° C., preferably from about 60 to 100° C. In practice, reaction below 20° C. are excessively slow and temperatures exceeding 120° C. are deleterious in that, and particularly in those instances where less reactive alcohols are employed, a base catalyzed dehydration of the nitroketone occurs leading to the formation of acids, amides and heterocyclic materials. Pressures of from 0 to 40 p.s.i.g. may be employed. In general, if the alcohol employed has a boiling point above the selected operating temperature, atmospheric pressure will suffice. When the alcohol possesses a boiling point below that of the selected temperature, the reaction can be conducted at autogenous pressure. The reaction time can vary from one-half to twenty hours.

The cleavage and esterification proceeds by contacting the alpha-nitroketone and alcohol with a catalyst selected from the group of carbonates, fluorides and salts of weakly acidic ion exchange resins of the metals sodium, potassium and calcium. The catalysts employed represent a class of commercially available materials which are solids at room temperature and in most instances are substantially insoluble in and easily recovered from the reactants and products contemplated herein. Illustrative of the catalysts are sodium carbonate, potassium carbonate, sodium fluoride, potassium fluoride, calcuim fluoride and the sodium, potassium or calcium salts of weakly acidic ion exchange resins. The weakly acidic ion exchange resins represent known materials and can be prepared by a cross-linking of an unsaturated carboxylic acid, such as acrylic acid, methacrylic acid or maleic acid, with a cross-linking agent such as divinylbenzene or ethylene dimethaacrylate or by condensation of resorcylic acid and formaldehyde. In general an ester of the acid is used in the suspension polymerization process and is subsequently hydrolyzed. Highly preferred catalysts in the instant method are potassium fluoride, sodium carbonate and the sodium salt of a weakly acidic ion exchange resin sold under the trade name "Amberlite IRC-50" by Rohm and Haas Company. In accordance with the inventive process, the alpha-nitroketone is contacted with the catalyst in a weight ratio of catalyst to nitroketone of between about 0.01:1 and 0.2:1 under non-aqueous conditions.

The esters prepared according to this invention correspond to the formula:

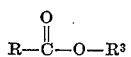

where R and R³ groups are heretofore defined. Specific examples of esters prepared by the instant catalytic method include by way of example methyl acetate, ethyl acetate, methyl propanoate, methyl butyrate, isopropyl pentanoate, 2-hexyl butyrate, isopropyl heptanoate, 2-octyl heptanoate, n-butyl octanoate, methyl nonanoate, ethyl phenylacetate, ethyl dodecanoate, methyl pentadecanoate, methyl pentadecanoate, methyl heptadecanoate and methyl benzoate. Such esters are useful as synthetic lubricants, cutting oils, plasticizers, cosmetic additives and surfactant additives. Further they can be utilized as intermediates in the preparation of fatty acids, amides, acid chlorides and alcohols.

The catalytic reaction outlined above involving cleavage and esterification of an alpha-nitroketone additionally forms as a co-product a nitroalkane corresponding to the formula:

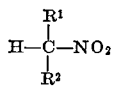

where R¹ and R² are groups heretofore defined. Examples of nitroalkanes so prepared include nitromethane, nitroethane, 1-nitrobutane, 1-nitrooctane and 1-nitro-2-phenylethane.

At the completion of the catalytic cleavage and esterification reaction the product comprises a mixture of catalyst, alcohol, solvent if employed, nitroalkane and ester. To recover the ester, the reaction mixture can be initially filtered to remove insoluble catalyst and thereafter distilled so as to separate excess alcohol, nitroalkane, solvent and ester. In place of distillation, a lower boiling nitroalkane, alcohol and solvent can be separated by evaporation under vacuum. Very high purities of ester can be obtained by vacuum distillation. Separation and recovery of nitroalkanes in the overhead or condensate from alcohols having different boiling points is easily accomplished by fractional distillation. Where the nitroalkane and alcohol have similar boiling points or form azeotropes, the overhead is separated by absorption of the nitroalkane on a suitable column containing for example silica gel or a basic ion exchange resin.

In order to more fully illustrate the nature of this invention and manner of practicing the same the following examples are presented. In the examples, each alcohol employed contained less than 0.1 weight percent water.

Example I

A solution containing 6.5 grams (20.8 mmoles) of 1-nitro-octadecanone, 70 milliliters (1.73 mole) of absolute methanol and 0.05 grams (0.47 mmole) of sodium carbonate was refluxed for 10 hours at 65° C. Thereafter an additional 25 milliliters of absolute methanol were added and 65 milliliters of methanol were subsequently distilled off at atmospheric pressure. The solution was further stripped at 20 to 25° C. under 40 mm. pressure and the residue diluted with diethylether and filtered. The filtrate was stripped of solvent under a pressure of 40 mm. and a white solid residue weighing 5.67 grams (96.2 percent yield) having a melting point of 30° C. was recovered and identified by infrared and nuclear magnetic resonance spectral analyses to be methyl heptadecanoate. Analysis of the methanol distillate by vapor phase chromatography showed it to contain 0.854 gram (67 percent yield) of nitromethane.

Example II

A solution containing 14.25 grams (50 mmoles) of 1-nitro-2-hexadecanone, 130 milliliters (3.22 moles) of anhydrous methanol and 0.5 gram (8.61 mmoles) of potassium fluoride was refluxed for one hour at 65° C. followed by partial distillation of 78 milliliters of methanol. Liquid-gas phase chromatographic analysis of the distillate (61.7 grams) showed it to contain 2.2 grams (72 percent yield) of nitromethane. The remaining solution was thereafter stripped of methanol, the residue dissolved in diethylether, filtered and distilled under reduced pressure. A fraction weighing 12.1 grams (94.3 percent yield) was obtained and identified by infrared analysis to be methyl pentadecanoate.

Example III

A solution of 14.25 grams (50 mmole of 1-nitro-2-hexadecanone, 130 milliliter (3.22 moles) of anhydrous methanol and 2.0 grams (16 milliequivalents) of the sodium salt of a weakly acidic ion exchange resin sold as "Amberlite IRC-50" was refluxed for 2 hours at 65° C. The methanol solution was then reduced in volume by atmospheric distillation and 55.7 grams of the distillate was found by vapor phase chromatographic analysis to contain 2.12 (69 percent yield) of nitromethane. The distillation residue was diluted with ether, filtered and 1.9 grams of the catalyst was recovered. The filtrate was then distilled under reduced pressure and the fraction boiling at 153–155° C. under 4 milliliters of pressure was recovered. This fraction weighing 10.2 grams (79.7 percent yield) was identified by infrared analysis and refractive index to be methyl pentadecanoate.

The catalyst recovered above was added to a second solution containing 14.25 grams (50 mmoles) of 1-nitro-2-hexadecanone and 130 milliliters (3.22 moles) of methanol. After refluxing at 65° C. for 3 hours, the methanol solution was reduced in volume by atmospheric distillation and 78.25 grams of distillate was found by vapor phase chromatographic analysis to contain nitromethane (90.2 percent yield). Distillation of the product as above afforded an 89.8 percent yield of methyl pentadecanoate (11.5 grams). The catalyst was again recovered and 1.9 grams of the same was used for a third run under the same conditions. Nitromethane (2.68 grams, 88.8 percent yield) and methyl pentadecanoate (11.05 grams, 86.2 percent yield) were again obtained. The recovered catalyst after drying weighed 1.84 grams.

Example IV

A glass column measuring 70 centimeters in length and 25 millimeters in diameter was charged with a mixture of 58.5 grams (468 milliequivalents) of the catalyst employed in Example III along with 93 grams of 5 mm. diameter solid glass balls and heated to 65–70° C. To the column contents were added 50 milliliters (1.23 mole) of methanol and a solution of 1-nitro-2-decanone (10 grams, 49.8 mmole) in 100 milliliters (2.46 moles) of warm methanol, the solution slowly passed through the column over a period of 2 hours. Infrared spectral analysis of a one milliliter sample of the effluent after solvent stripping indicated the presence of methyl nonanoate along with some unreacted nitroketone. To insure complete reaction, the methanol effluent was passed three additional times through the column, each pass taking one hour. The final effluent was found to contain methanol, nitromethane (0.94 gram, 31 percent yield) and methyl nonaoate (8.26 grams, 96 percent yield).

Example V

A solution containing 17.3 grams (100 mmoles) of 1-nitro-2-octanone, 100 milliliters (1.3 mole) of absolute isopropanol and 0.5 grams (4.72 mmoles) of sodium carbonate was refluxed for 16 hours at a temperature of 83° C. A 50 milliliter portion of isopropanol was then distilled off and the solution diluted with 200 milliliters of diethylether and the filtrate thereafter stripped of ether and isopropanol. Analysis of the residue by infrared analysis and nuclear magnetic resonance showed it to contain isopropyl heptanoate (31 percent yield) along with a mixture of heptanoic acid and amide. In an analagous experiment employing tertiary butyl alcohol the product consisted of recovered alpha-nitroketone, carboxylic acid and amide. No ester was detected.

Example VI

A solution containing 1.65 grams (10 mmoles) of alphanitroacetophenone, 25 milliliters (620 mmoles) of dry methanol and 0.1 gram (17.2 mmole) of potassium fluoride was refluxed at 65° C. for three hours. After cooling the solution, a 10 microliter sample was taken for vapor phase chromatographic analysis. Basis this analysis the solution was calculated to contain nitromethane (0.18 gram, 30 percent yield) and methyl benzoate (1.17 gram, 86 percent yield). The solution was further diluted with diethylether, the potassium fluoride separated by filtration and the filtrate stripped of methanol and nitromethane at a temperature of 30 to 35° C. under a pressure of 25 to 30 mm. The infrared spectrum of the residue (1.2 grams) showed only absorption bands attributable to methyl benzoate.

Example VII

A mixture of 8-nitro-9-heptadecanone and 9-nitro-8-heptadecanone (4.0 grams, 13.4 mmoles) was dissolved in 70 milliliters (1.7 moles) of anhydrous methanol. To this solution was added 1.5 grams (12 milliequivalents) of the sodium salt of "Amberlite IRC–50" and the resulting mixture was refluxed at 65° C. for 5 hours. The solution was cooled, filtered free of insolubles and the filtrate stripped of solvent. The residue (3.81 grams, 86 percent yield) was found to consist of a mixture of methyl esters and nitroparaffins basis infrared analysis. Vapor phase chromatographic analysis further showed the product essentially consisted of equal parts of methyl octanoate, methyl nonanoate, 1-nitrooctane and 1-nitrononane.

I claim:

1. A method for the preparation of esters which comprises catalytically cleaving and reacting an alpha-nitroketone wherein said alpha-nitroketone corresponds to the formula:

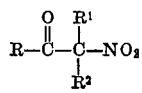

where R is an alkyl group of 1 to 20 carbon atoms or an aryl group of from 6 to 20 carbon atoms, and where $R^1$ and $R^2$ are hydrogen, alkyl groups of from 1 to 20 carbon atoms or aryl groups of from 6 to 20 carbon atoms with an alcohol at a temperature of from about 20° C. to 120° C. in a non-aqueous environment with a substantially insoluble catalyst selected from the group consisting of carbonates, fluorides and salts of weakly acid ion exchange resins of the metals sodium, potassium and calcium.

2. A method according to Claim 1 wherein said alcohol is a primary or secondary alcohol corresponding to the formula $R^3OH$, where $R^3$ is an alkyl group of from 1 to 20 carbon atoms.

3. A method according to Claim 1 wherein said temperature is from about 60° C. to 100° C.

4. A method according to Claim 1 wherein said cleaving and reacting is conducted at a pressure of from 0 to 40 p.s.i.g.

5. A method according to Claim 1 wherein said catalyst is sodium carbonate.

6. A method according to Claim 1 wherein said catalyst is potassium fluoride.

7. A method according to Claim 1 wherein said catalyst is sodium fluoride.

8. A method according to Claim 1 wherein said catalyst is calcium fluoride.

9. A method according to Claim 1 wherein said catalyst is the sodium salt of a weakly acidic ion exchange resin.

10. A method according to Claim 1 wherein said nitroketone is 1-nitro-2-hexanone.

11. A method according to Claim 1 wherein said nitroketone is 1-nitro-2-octanone.

12. A method according to Claim 1 wherein said nitroketone is 1-nitro-2-decanone.

13. A method according to Claim 1 wherein said nitroketone is 1-nitro-2-hexadecanone.

14. A method according to Claim 1 wherein said nitroketone is 1-nitro-2-octadecanone.

15. A method according to Claim 1 wherein said alcohol is methanol.

16. A method according to Claim 1 wherein said alcohol is ethanol.

17. A method according to Claim 1 wherein said alcohol is isopropanol.

18. A method according to Claim 1 wherein said alcohol is ethylene glycol.

19. A method according to Claim 1 wherein said ester is methyl heptanoate.

20. A method according to Claim 1 wherein said ester is methyl nonanoate.

21. A method according to Claim 1 wherein said ester is methyl pentadecanoate.

22. A method according to Claim 1 wherein said ester is methyl heptadecanoate.

23. A method according to Claim 1 wherein said ester is methyl benzoate.

References Cited
UNITED STATES PATENTS
3,551,465  12/1970  Ellis _____ 260—410.9

LEWIS GOTTS, Primary Examiner

D. G. RIVERS, Assistant Examiner

260—410.6, 476 R, 488 F, 488 J